United States Patent

Bleibinhaus et al.

Patent Number: 5,831,406
Date of Patent: Nov. 3, 1998

[54] ELECTRIC SERVO-DRIVE

[75] Inventors: Joerg Bleibinhaus, Stein; Joachim Kempkes, Nuremberg, both of Germany

[73] Assignee: Siemens Aktiengesellschaft, Munich, Germany

[21] Appl. No.: 782,359

[22] Filed: Jan. 13, 1997

[30] Foreign Application Priority Data

Jan. 12, 1996 [DE] Germany ................. 196 00 942.1

[51] Int. Cl.⁶ .................................................. G05B 5/00
[52] U.S. Cl. .................... 318/471; 318/469; 318/474; 318/484; 251/129.12; 251/134
[58] Field of Search ................................ 318/471, 469, 318/474, 484; 251/129.12, 134

[56] References Cited

U.S. PATENT DOCUMENTS

| | | | |
|---|---|---|---|
| Re. 31,569 | 5/1984 | Eshghy | 251/129.12 X |
| 4,316,512 | 2/1982 | Kibblewhite et al. | 318/471 X |
| 4,455,012 | 6/1984 | Gupta | 318/469 X |
| 4,460,007 | 7/1984 | Pirkle | 251/134 X |
| 4,967,274 | 10/1990 | Hood et al. | 251/129.12 |
| 4,981,068 | 1/1991 | Glass et al. | 318/484 X |
| 5,597,008 | 1/1997 | Overdiek et al. | 251/129.12 |

FOREIGN PATENT DOCUMENTS

| | | |
|---|---|---|
| 0 327 676 | 8/1989 | European Pat. Off. . |
| 39 41 651 | 6/1991 | Germany . |
| 41 11 039 | 10/1992 | Germany . |

*Primary Examiner*—Karen Masih
*Attorney, Agent, or Firm*—Kenyon & Kenyon

[57] ABSTRACT

An electric servo-drive for adjusting a control element between an open position and a closed position. The tightness of the control element in the closed position can be assured without any additional tightening device. Starting signals are issued to the drive motor by a control unit after the control element reaches the closed position, thus causing the control element to be driven further in the direction of the closed position by the drive motor.

3 Claims, 1 Drawing Sheet

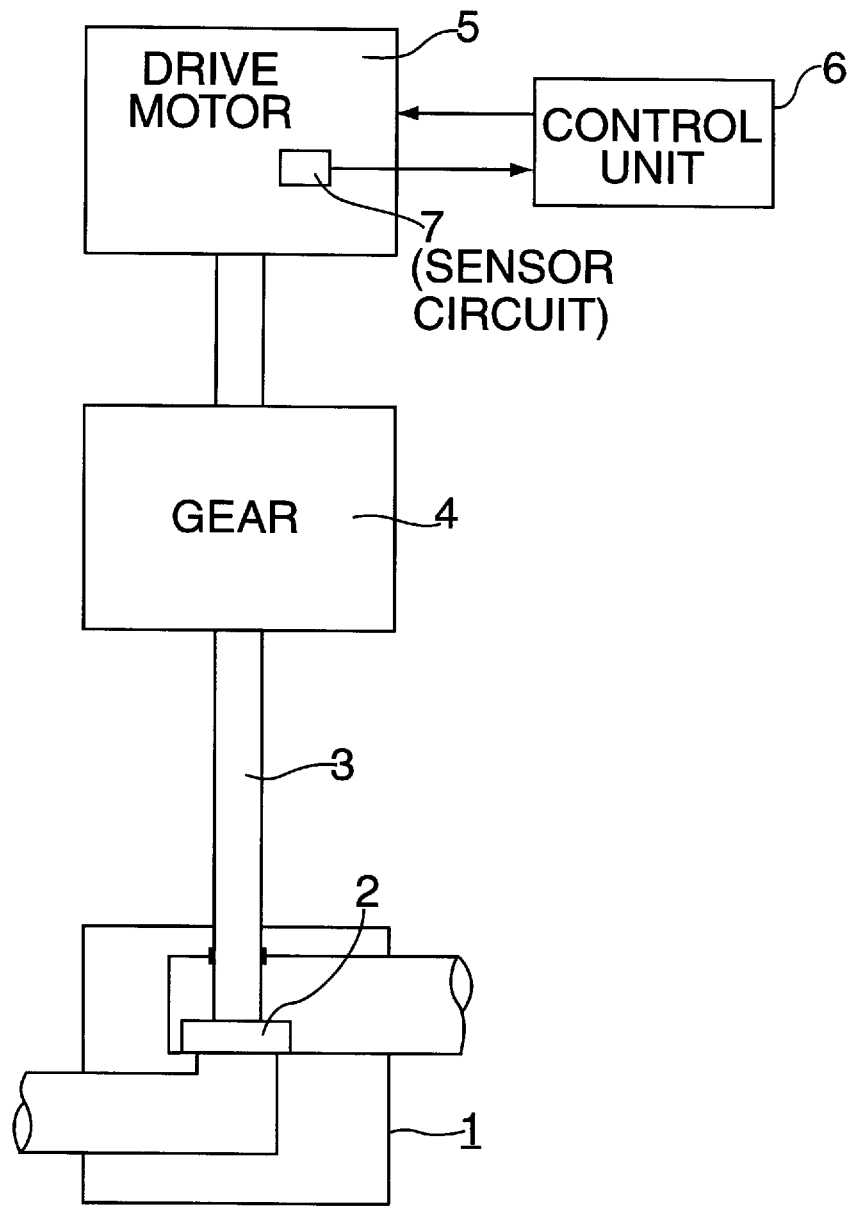

ELECTRIC SERVO-DRIVE

BACKGROUND INFORMATION

The present invention is directed to an electric servo-drive, and in particular to an electric servo-drive that includes an adjustable control element that can be switched by a drive motor between an open position and a closed position.

When coupled to pipeline fittings such servo-drives are operable to cut off the proper pipeline when the fitting is in the closed position. For example, there are applications where the pipeline fitting is closed when a temperature exceeds a predetermined threshold. Servo-drives are usually designed so that for the closing operation, the drive motor of the servo-drive is stopped at a torque sufficient to close the fitting tightly. After a fitting which is hot is closed, the fitting subsequently cools down. As the fitting cools, the connecting parts between the servo-drive and the fitting shrink, thus reducing the tightness of the fitting achieved in the high temperature state. As a result of this cooling, the fitting may develop a leak.

To maintain a continuous pressure when the valve is closed, European Patent A 327,676 discloses a design with a spring pack which is put under tension by the drive motor when approaching the closed position of the valve. The spring pack maintains the pressure for the valve after the motor is shut down. Such a spring pack also requires a great deal of space.

Thus, there is a need to improve on an electric servo-drive to ensure that such a fitting will not leak during or after cooling, without requiring additional fixtures.

SUMMARY OF THE INVENTION

An electric servo-drive according to a representative embodiment of the present invention provides starting signals to the drive motor at intervals by a control program after the control element reaches the closed position, thus further driving the control element by the drive motor in the direction of the closed position. The starting signals generated at such intervals cause the fitting to be repeatedly driven by the drive motor into the closed position, so that when the tightness of the fitting declines due to cooling, the fitting can be repeatedly tightened to its closed position again.

In the simplest type of control, the intervals between the control signals are preset by the control program.

In order to control the drive motor in accordance with actual conditions, at least one sensor element is provided to detect a change in position occurring in the control element in response to a starting signal that has been provided to the drive motor. The interval for the next starting signal is varied as a function of this change in position. Thus, for example, with a relatively great change in position measured on the control element, the next starting signal is delivered after a relatively short interval, and as the changes in position of the control element become smaller, the interval between starting signals becomes progressively longer until finally no starting signals are issued when no change in position can be detected.

When the drive motor is controlled in accordance with the thermal time constant of the fitting, the starting signals are issued at short intervals at the start of the cooling phase when the temperature drops steeply. As the steepness of the temperature curve declines, the intervals become longer accordingly until finally the starting signals cease entirely.

BRIEF DESCRIPTION OF THE DRAWING

The sole drawing in this application illustrates an electric servo drive in accordance with a representative embodiment of the present invention.

DETAILED DESCRIPTION

Fitting 1 includes a control element, such as a valve disk 2, that can be raised and lowered by a driving element, such as actuating spindle 3. Actuating spindle 3 is operated by drive motor 5 via gear 4. Drive motor 5 is associated with control unit 6, which issues starting signals to the drive motor 5 according to a certain control program.

Sensor element 7 can be provided for drive motor 5 to detect the angle of rotation of the rotor or the shaft, which is a measure of the change in position of valve disk 2. Sensor element 7 then transmits signals to control unit 6 in accordance with the change in position of valve disk 2. These signals control the intervals between the starting signals delivered by control unit 6 to drive motor 5 so that the interval between starting signals is small when the change in position is relatively great, and as the change in position becomes smaller the interval increases until no starting signals at all are delivered when there is a "zero" change in position.

When a fitting is closed under high temperature conditions, the fitting cools according to an exponential function, i.e., the cooling curve is steepest immediately after the fitting closes. Due to this steep cooling, the pressure on valve disk 2 also drops greatly, so there is a relatively great change in position of valve disk 2 when it is retightened by drive motor 5. Thus, the next starting signal is issued in a very short interval and the valve disk is tightened again. This assures tight closing of valve disk 2 even during the steep cooling phase.

Instead of detecting the change in position, the temperature of the fitting can also be detected by a temperature sensor, and the control program can be designed on the basis of the temperature. For example, the information provided by the temperature sensor can be used to determine the thermal time constant of the control element, and the control program can be designed on the basis of this thermal time constant.

If drive motor 5 is supplied with power via a converter, it is possible to adjust the stalling torque of the drive motor by regulating the voltage level and the frequency of the voltage supply such that the stalling torque corresponds to the tightening torque of valve disk 2. Then drive motor 5 will come to a standstill again on reaching the required tightening torque. In addition, there is no danger of overtightening valve disk 2.

What is claimed is:

1. An electric servo-drive for adjusting a control element between an open and a closed position, comprising:
    a drive motor coupled to the control element; and
    a control unit coupled to the drive motor, the control unit issuing to the drive motor a plurality of starting signals delivered at intervals after the control element reaches the closed position,
    wherein the plurality of starting signals causes the drive motor to drive the control element further in a direction towards the closed position.

2. The electric servo-drive according to claim 1, wherein the intervals at which the plurality of starting signals is delivered to the drive motor are controlled by the control unit.

3. The electric servo-drive according to claim 1, further comprising a sensor element coupled to the drive motor, the sensor element detecting a change in position of the control element, wherein an interval of a next starting signal to be supplied to the drive motor is determined as a function of the detected change in position of the control element.

* * * * *